(No Model.)
M. GROSS.
MIXING AND INJECTING APPARATUS FOR MAKING GAS.
No. 393,977. Patented Dec. 4, 1888.
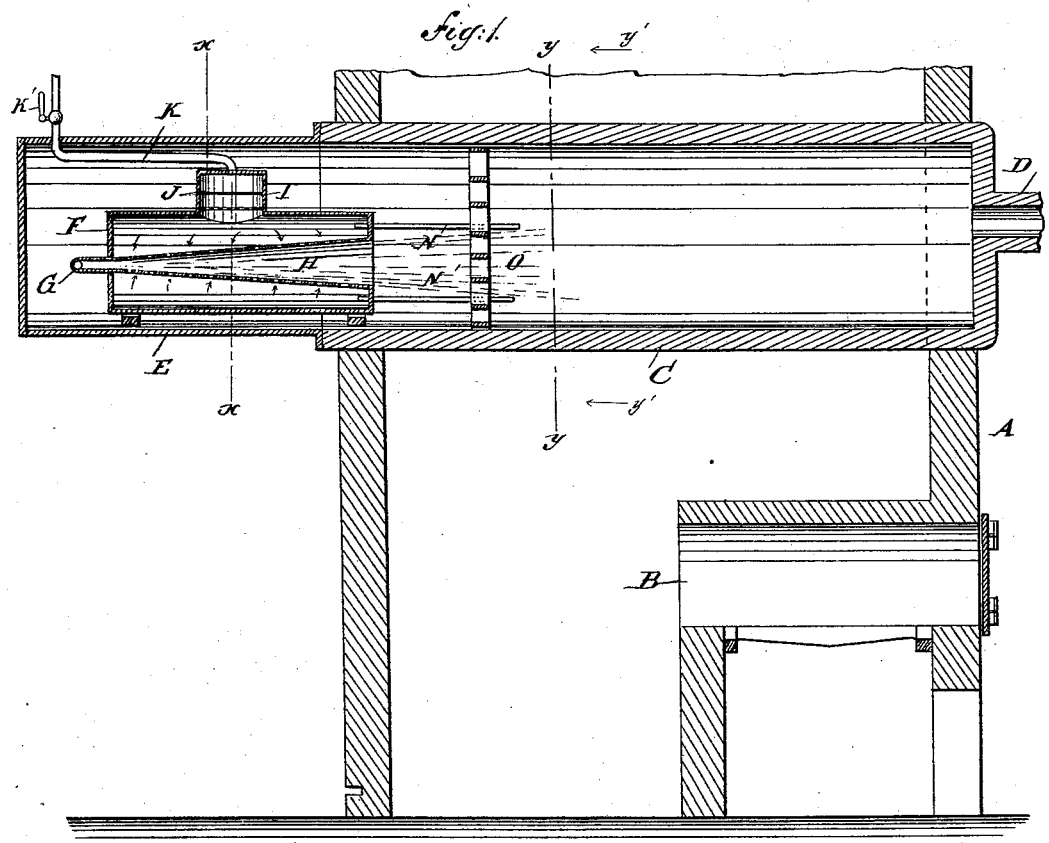
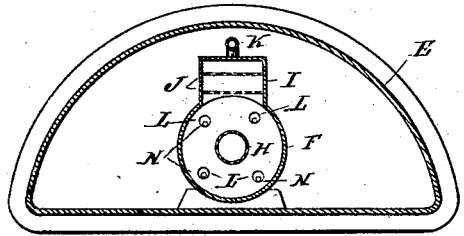
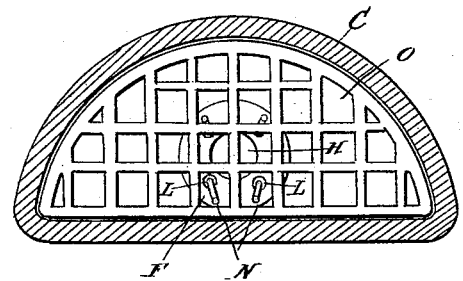
WITNESSES: INVENTOR.

UNITED STATES PATENT OFFICE.

MAGNUS GROSS, OF NEW YORK, N. Y.

MIXING AND INJECTING APPARATUS FOR MAKING GAS.

SPECIFICATION forming part of Letters Patent No. 393,977, dated December 4, 1888.

Application filed December 17, 1887. Serial No. 258,246. (No model.)

*To all whom it may concern:*

Be it known that I, MAGNUS GROSS, a citizen of the United States, residing at New York, in the county of New York and State of New York, have invented certain new and useful Improvements in Mixing and Injecting Apparatus for Making Gas; and I do hereby declare the following to be a clear and exact description of the invention, such as will enable others skilled in the art to which it appertains to make and use the same.

My invention relates to jet-mixers employed in the manufacture of illuminating and heating gas.

The object is to produce an apparatus by means of which hydrocarbon liquid and steam may instantly be most intimately mixed under the best conditions, and to the best advantage and in most favorable conditions be forcibly presented to a distilling-retort, the apparatus to be at once simple in construction and certain, economical, and efficient in operation. The object is, furthermore, to provide a new and improved apparatus for thoroughly vaporizing and mixing liquid hydrocarbons with superheated steam and forcing the mixture into a retort or other gas-generator to be fixed into gas, the operation to be such that no lowering of the temperature which is required for this process of gas-making is caused in the highly-heated retort or distilling-chamber.

With these objects in view the invention resides in a mixing and injecting apparatus consisting of a box or casing containing a perforated tube closed at one end and open at the other, and having an oil-feed, the perforated tube connecting with a steam-pipe, and the oil-feed being exterior to the tube, whereby hydrocarbon is drawn in numerous minute streams or in fine portions into the steam, insuring thorough, instantaneous, and most intimate admixture, and the mixture is forcibly projected from the open end of the tube.

The invention resides, furthermore, in a mixing and injecting apparatus consisting of a box or casing containing a perforated tube closed at one end and open and flaring at the other, and having an oil-feed, the perforated tube connecting at its closed end with a steam-pipe, and the oil-feed bringing oil into the box or casing outside of the perforated tube, whereby hydrocarbon is drawn in numerous minute streams or in fine portions into the blast of steam, insuring thorough, instantaneous, and most intimate incorporation or digestion, and the mixture is forcibly projected from the open end of the tube and spread.

The invention resides, furthermore, in a mixing and injecting apparatus consisting of a box or casing of suitable metal or other substance capable of being highly heated and of conducting heat, said box or casing containing a perforated pipe of similar substance, closed at one end and open at the other, the box having also an oil-feed delivering outside the pipe, whereby, when the box or casing is properly heated, the hydrocarbon drawn in numerous minute streams or in finely-divided conditions into the steam for incorporation therewith will be hot or in the form of vapor, and so will more readily mix with the steam, the heat of the steam being also kept up by the hot casing, and when the mixture is projected from the open end of the pipe it will not tend to cool any surface with which it comes in contact.

The invention resides, furthermore, in a mixing and injecting apparatus consisting of a box or casing capable of being heated and of conveying heat, said box having the steam-connected, perforated, open-ended pipe and an oil-receptacle, whereby, among the other advantages enumerated, the oil may be heated before delivery into the casing.

The invention resides, furthermore, in a mixing and injecting apparatus consisting of a box or casing capable of being heated, having the steam-connected perforated open-ended pipe and an oil-receptacle provided with one or more perforated bottoms or partitions, whereby, with the other advantages enumerated, the heated hydrocarbon liquid will be better distributed in its entrance to the box or casing; and, finally, the invention resides in a mixing and injecting apparatus consisting of a box or casing capable of being heated and having the steam-connected, perforated, open-ended pipe and a suitable oil-feed, combined with the heat-conducting rods, whereby the casing may be additionally heated from the retort or chamber with which it is connected.

It is obvious that my mixing and injecting apparatus may be heated in various furnaces, and may be connected up with retorts or distilling apparatus of various kinds, and is not limited in its applicability to any particular situation. For mere sake of illustration I have shown it here applied in apparatus forming the subject-matter of another application filed December 17, 1887, and numbered 258,245.

In the accompanying drawings, forming part of this specification, and in which like letters of reference indicate corresponding parts, Figure 1 is a sectional side elevation of the improvement as applied. Fig. 2 is a sectional end view of the same on the lines $x$ $x$ of Fig. 1. Fig. 3 is a like view of the same on the lines $y$ $y$ of Fig. 1, looking in the direction of the arrows $y'$.

With the outer end or one of the sides of a box or casing, F, of some substance capable of receiving and imparting heat—say of suitable metal or earthenware—connects a pipe, G, leading to a steam-superheater, and serving to supply the necessary quantity of superheated steam. The pipe G opens into the small end of a conical or flaring perforated tube, H, held centrally in the box F and open at its larger end. On the top of the box F is located a receptacle, I, which may be dome-shaped, and may be provided with two or more horizontally-extending perforated bottoms, J. Into the top or side of the receptacle I, or directly into the box, opens a pipe, K, connected with a source of oil-supply for furnishing the necessary quantity of liquid hydrocarbon. A valve, K', on the said pipe K serves to regulate the amount of liquid hydrocarbon to be discharged.

In the inner end of the box F there may be several apertures, L, to permit the surplus vapors possibly escaping draft by the steam-current and accumulating in the box F to pass directly into the retort C. From this end of the box F project two, four, or more heat-conducting metallic rods, N, preferably made of copper, to carry heat from a proper source backward to the box, to assist in heating the latter for the purpose of more readily vaporizing the liquid hydrocarbons entering through pipe K and preserving the heat of the steam.

My mixing and injecting apparatus may be employed in any suitable manner—say as follows: A is a furnace of suitable size and form, and provided with a fire-place, B, for generating the necessary heat for heating a retort, C. The retort C is connected at one end by the aperture D with the usual stand-pipe, (not shown,) and on the other end is held a mouth-piece, E, in which the mixing and injecting apparatus is located. The farther ends of the heat-conducting copper rods rest in the fire-clay disk O, held in the retort C.

The operation is as follows: The superheated steam is led from the superheater through the pipe G by means of an attached nozzle of suitable diameter into the conical perforated tube H, which, on account of its funnel shape or flaring mouth, permits the steam to expand, so that it enters the retort in rays, and not in clouds, as in the absence of such a provision would be the case, and which provision also creates an inducing-current, drawing into the tube H through the numerous perforations the oil or floating oil vapors in the box F, commingling the same intimately with the superheated steam before reaching the retort C. The pressure under which the superheated steam enters the box F and the action of an exhauster on the hydraulic main insure steadiness and uniformity in the above-described movements. This mixture of steam and oil vapors is discharged through the wider end of the tube H into the retort C, in which it is instantaneously converted into fixed gas.

The retort C is heated to a high degree from the heat generated in the fire-place B in the usual manner.

The box F is heated by the heat passing from the highly-heated retort C in the direction of the mouth-piece E, and considerable additional heat is conducted to the box F by the copper rods N, so that the liquid hydrocarbons entering the receptacle I through the pipe K are quickly converted into vapors and without affecting the temperature of the superheated steam.

The apertures L in the end of the box F prevent any tension of possibly accumulating vapors, so the surplus vapors can pass through said apertures directly into the retort C, to be converted into fixed gas.

Having thus fully described my invention, what I claim as new, and desire to secure by Letters Patent, is—

1. A mixing and injecting apparatus consisting of a box or casing containing a perforated tube closed at one end and open at the other, and having an oil-feed, the perforated tube connecting with a steam-pipe, and the oil-feed being exterior to the tube, whereby hydrocarbon is drawn in numerous minute streams or in fine portions into the steam, insuring thorough, instantaneous, and most intimate admixture, and the mixture is forcibly projected from the open end of the tube, substantially as described.

2. A mixing and injecting apparatus consisting of a box or casing containing a perforated tube closed at one end and open and flaring at the other, and having an oil-feed, the perforated tube connecting at its closed end with a steam-pipe, and the oil-feed bringing oil into the box or casing outside of the perforated tube, whereby hydrocarbon is drawn in numerous minute streams or in fine portions into the blast of steam, insuring thorough, instantaneous, and most intimate incorporation or digestion, and the mixture is forcibly projected from the open end of the tube and spread, substantially as described.

3. A mixing and injecting apparatus consisting of a box or casing containing a perforated tube closed at one end and open at the other, and having an oil-feed and bearing an oil-receptacle, the perforated tube connecting with a steam-pipe, and the oil-feed leading from the oil-receptacle and being exterior to the tube, substantially as and for the purpose specified.

4. A mixing and injecting apparatus consisting of a box or casing capable of being heated, having the steam-connected perforated open-ended pipe, and an oil-receptacle connected with said box and provided with one or more perforated bottoms or partitions, whereby, with the other advantages enumerated, the heated hydrocarbon liquid will be better distributed in its entrance to the box or casing, substantially as set forth.

5. A mixing and injecting apparatus consisting of a box or casing capable of being heated, and having the steam-connected perforated open-ended pipe and a suitable oil-feed, combined with the heat-conducting rods, whereby the casing may be additionally heated from the retort or chamber with which it is connected, all substantially as and for the purpose described.

MAGNUS GROSS.

Witnesses:
 JNO. W. LINCH,
 FRED S. LAX.